US006824915B1

(12) United States Patent
Pedicini (10) Patent No.: US 6,824,915 B1
(45) Date of Patent: Nov. 30, 2004

(54) AIR MANAGING SYSTEMS AND METHODS FOR GAS DEPOLARIZED POWER SUPPLIES UTILIZING A DIAPHRAGM

(75) Inventor: Christopher S. Pedicini, Roswell, GA (US)

(73) Assignee: The Gillette Company, Boston, MA (US)

( * ) Notice: Subject to any disclaimer, the term of this patent is extended or adjusted under 35 U.S.C. 154(b) by 369 days.

(21) Appl. No.: 09/602,187

(22) Filed: Jun. 12, 2000

(51) Int. Cl.$^7$ .......................... H01M 12/06; F04B 17/00
(52) U.S. Cl. .......................... 429/72; 429/7; 429/121; 429/83; 417/413.2
(58) Field of Search .............................. 429/1, 4, 7, 10, 429/72, 34, 83, 121, 71, 27, 3, 38, 39; 417/413.3, 413.2, 322, 413.1; 310/17, 15, 334, 800; 335/229

(56) References Cited

U.S. PATENT DOCUMENTS

| | | |
|---|---|---|
| 737,613 A | 9/1903 | Halsey |
| 1,112,861 A | 10/1914 | Snyder |
| 1,285,659 A | 11/1918 | Ford |
| 2,273,244 A | 2/1942 | Ambruster |
| 2,275,281 A | 3/1942 | Berl |
| 2,468,430 A | 4/1949 | Derksen |
| 3,072,284 A | 1/1963 | Luhman, Jr. |
| 3,160,528 A | 12/1964 | Dengler |
| 3,395,047 A | 7/1968 | Terry et al. |
| 3,473,963 A | 10/1969 | Sanderson |
| 3,523,830 A | 8/1970 | Baker et al. |
| 3,554,810 A | 1/1971 | Zaromb |
| 3,576,677 A | 4/1971 | Keating, Jr. et al. |
| 3,613,732 A | 10/1971 | Willson |
| 3,615,839 A | 10/1971 | Thompson |
| 3,629,009 A | 12/1971 | Bennett |
| 3,632,449 A | 1/1972 | Yardney |
| 3,666,562 A | 5/1972 | Sprengel |
| 3,740,636 A | 6/1973 | Hogrefe et al. |
| 3,744,516 A | 7/1973 | Rowe |
| 3,801,372 A | 4/1974 | Shaw |
| 3,850,695 A | 11/1974 | Keller et al. |
| 3,871,920 A | 3/1975 | Grebier et al. |
| 3,909,302 A | 9/1975 | Mermelstein |
| 4,052,534 A | 10/1977 | Devitt |
| 4,063,826 A | 12/1977 | Riepe |
| 4,118,544 A | 10/1978 | Przybyla et al. |
| 4,139,846 A | 2/1979 | Conforti |
| 4,177,327 A | 12/1979 | Mathews et al. |
| 4,207,514 A | 6/1980 | Klein |
| 4,221,644 A | 9/1980 | LaBarre |
| 4,246,324 A | 1/1981 | de Nora et al. |
| 4,254,190 A | 3/1981 | Zaromb |
| 4,262,062 A | 4/1981 | Zatsky |
| 4,269,906 A | 5/1981 | Schmechtig |
| 4,310,604 A | 1/1982 | Marchetti |
| 4,316,185 A | 2/1982 | Watrous et al. |

(List continued on next page.)

FOREIGN PATENT DOCUMENTS

| | | |
|---|---|---|
| EP | 0 044 060 A2 | 1/1982 |
| EP | 0 293 007 A2 | 11/1988 |
| EP | 0341189 | 11/1989 |

(List continued on next page.)

OTHER PUBLICATIONS

Riezenman, M.J., "The Search for Better Batteries", *IEEE Spectrum*, May 1995.

(List continued on next page.)

*Primary Examiner*—Bruce F. Bell
*Assistant Examiner*—Monique Wills
(74) *Attorney, Agent, or Firm*—Fish & Richardson P.C.

(57) ABSTRACT

Air managers for power supplies such as metal-air batteries or fuel cells are described. In some embodiments, the air managers can include a diaphragm, the movement of which can cause air to be exchanged, for example, between the interior and exterior of the casing of a metal-air battery or fuel cell.

22 Claims, 6 Drawing Sheets

U.S. PATENT DOCUMENTS

| | | |
|---|---|---|
| 4,318,092 A | 3/1982 | Cowles et al. |
| 4,399,200 A | 8/1983 | Galloway |
| 4,405,387 A | 9/1983 | Albrecht et al. |
| 4,448,858 A | 5/1984 | Graf et al. |
| 4,484,691 A | 11/1984 | Lees |
| 4,490,443 A | 12/1984 | Ruch et al. |
| 4,493,880 A | 1/1985 | Lund |
| 4,521,497 A | 6/1985 | Tamminen |
| 4,560,626 A | 12/1985 | Joy |
| 4,642,273 A | 2/1987 | Sasaki |
| 4,648,807 A | 3/1987 | Tippetts et al. |
| 4,687,714 A | 8/1987 | Oltman et al. |
| 4,729,930 A | 3/1988 | Beal et al. |
| 4,745,038 A | 5/1988 | Brown |
| 4,855,195 A | 8/1989 | Georgopoulos et al. |
| 4,857,885 A | 8/1989 | Umerez |
| 4,859,545 A | 8/1989 | Scheffler et al. |
| 4,894,295 A | 1/1990 | Cheiky |
| 4,904,548 A | 2/1990 | Tajima |
| 4,908,281 A | 3/1990 | O'Callaghan |
| 4,913,983 A | 4/1990 | Cheiky |
| 4,938,742 A | 7/1990 | Smits |
| 4,943,750 A | 7/1990 | Howe et al. |
| 4,957,826 A | 9/1990 | Cheiky |
| 5,011,380 A | 4/1991 | Kovacs |
| 5,047,961 A | 9/1991 | Simonsen |
| 5,066,204 A | 11/1991 | Point et al. |
| 5,069,986 A | 12/1991 | Dworkin et al. |
| 5,085,562 A | 2/1992 | Van Lintel |
| 5,141,826 A | 8/1992 | Bohm et al. |
| 5,183,222 A | 2/1993 | Ramsey, Jr. |
| 5,185,549 A * | 2/1993 | Sullivan ..................... 310/334 |
| 5,191,274 A | 3/1993 | Lloyd et al. |
| 5,196,275 A | 3/1993 | Goldman et al. |
| 5,208,526 A | 5/1993 | Goldman et al. |
| 5,211,371 A | 5/1993 | Coffee |
| 5,258,239 A | 11/1993 | Kobayashi |
| 5,304,431 A | 4/1994 | Schumm, Jr. |
| 5,306,579 A | 4/1994 | Shepard, Jr. et al. |
| 5,325,880 A | 7/1994 | Johnson et al. |
| 5,328,777 A | 7/1994 | Bentz et al. |
| 5,354,625 A | 10/1994 | Bentz et al. |
| 5,356,729 A | 10/1994 | Pedicini |
| 5,362,577 A | 11/1994 | Pedicini |
| 5,387,477 A | 2/1995 | Cheiky |
| 5,398,011 A | 3/1995 | Kimura et al. |
| 5,411,644 A | 5/1995 | Neukermans |
| 5,417,235 A | 5/1995 | Wise et al. |
| 5,434,016 A | 7/1995 | Benz et al. |
| 5,439,758 A | 8/1995 | Stone et al. |
| 5,449,569 A | 9/1995 | Schumm, Jr. |
| 5,466,932 A | 11/1995 | Young et al. |
| 5,486,429 A | 1/1996 | Thibault |
| 5,506,067 A | 4/1996 | Tinker |
| 5,522,712 A | 6/1996 | Winn |
| 5,529,465 A | 6/1996 | Zengerle et al. |
| 5,536,590 A | 7/1996 | Cheiky |
| 5,554,452 A | 9/1996 | Delmolino et al. |
| 5,560,999 A | 10/1996 | Pedicini et al. |
| 5,563,004 A | 10/1996 | Buzzelli et al. |
| 5,567,284 A | 10/1996 | Bauer et al. |
| 5,569,551 A | 10/1996 | Pedicini et al. |
| 5,571,630 A | 11/1996 | Cheiky |
| 5,599,174 A | 2/1997 | Cook et al. |
| 5,607,292 A * | 3/1997 | Rao ........................... 417/417 |
| 5,619,177 A | 4/1997 | Johnson et al. |
| 5,622,482 A | 4/1997 | Lee |
| 5,639,568 A | 6/1997 | Pedicini et al. |
| 5,641,585 A | 6/1997 | Lessing et al. |
| 5,641,588 A | 6/1997 | Sieminski et al. |
| 5,678,647 A | 10/1997 | Wolfe et al. |
| 5,691,074 A | 11/1997 | Pedicini |
| 5,691,075 A | 11/1997 | Batawi |
| 5,712,052 A | 1/1998 | Kawatsu |
| 5,721,064 A | 2/1998 | Pedicini et al. |
| 5,730,587 A | 3/1998 | Snyder et al. |
| 5,747,187 A | 5/1998 | Byon |
| 5,753,384 A | 5/1998 | Kimberg |
| 5,758,823 A | 6/1998 | Glezer et al. |
| 5,759,014 A | 6/1998 | Van Lintel |
| 5,778,513 A | 7/1998 | Miu et al. |
| 5,786,980 A | 7/1998 | Evans |
| 5,853,910 A | 12/1998 | Tomioka et al. |
| 5,861,703 A | 1/1999 | Losinski |
| 5,914,507 A | 6/1999 | Polla et al. |
| 5,916,704 A | 6/1999 | Lewin et al. |
| 5,919,582 A | 7/1999 | Pedicini et al. |
| 6,033,191 A | 3/2000 | Kamper et al. |
| 6,106,962 A | 8/2000 | Pedicini et al. |
| 6,274,261 B1 | 8/2001 | Tinker et al. |
| 6,359,374 B1 * | 3/2002 | Dausch et al. .............. 310/330 |
| 6,361,294 B1 * | 3/2002 | Witzigreuter et al. ..... 417/413.3 |
| 6,475,658 B1 * | 11/2002 | Pedicini et al. ................ 429/34 |

FOREIGN PATENT DOCUMENTS

| | | |
|---|---|---|
| EP | 0 341 189 B1 | 11/1989 |
| FR | 1575640 | 7/1969 |
| FR | 2353142 | 5/1976 |
| GB | 1 221 196 | 4/1999 |
| JP | 50-40772 | 4/1975 |
| JP | 60091569 | 5/1985 |
| JP | 6 311 0558 | 5/1988 |
| JP | 4 345773 | 12/1992 |
| JP | 10 148181 A | 6/1998 |
| WO | WO 90/11625 A1 | 10/1990 |
| WO | WO 93/18556 A1 | 9/1993 |
| WO | WO 93/19495 A1 | 9/1993 |
| WO | WO 94/02966 A2 | 2/1994 |
| WO | WO 94/08358 A1 | 4/1994 |
| WO | WO 94/25991 A2 | 11/1994 |
| WO | WO 97/15090 A2 | 4/1997 |
| WO | WO 99/16145 A1 | 4/1999 |
| WO | WO 00/36696 A1 | 6/2000 |
| WO | WO 00/38266 A1 | 6/2000 |

OTHER PUBLICATIONS

"Actuator Wire—A Solid State Actuator That Moves By Molecular Restructuring", 3 pages. [Retrieved on Feb. 13, 2004.] Retrieved from the Internet: <URL: http://www.e-hag.ch/PDF–Files/Dynalloy/HP–Dynalloy.pdf>.

*Using Shape Memory Wires* (Part Two), Mondo–tronics, Inc., pp. 2–1–2–12, Gilbertson.

*Microprocessor Voltage Monitors with Programmable Voltage Detection*, Maxim, *MAX8211/MAX8212*, pp. 1–2, May 1999.

U.S. application Ser. No. 09/216,026, Inventor: Pedicini et al., Filed Dec. 18, 1998 entitled *Air Manager Systems for Metal–Air Batteries Utilizing a Diaphragm or Bellows*.

\* cited by examiner

FIG. 6

AIR MANAGING SYSTEMS AND METHODS FOR GAS DEPOLARIZED POWER SUPPLIES UTILIZING A DIAPHRAGM

RELATED APPLICATIONS

The following patent applications for related subject matter,

"CYLINDRICAL METAL-AIR BATTERY WITH A CYLINDRICAL PERIPHERAL AIR CATHODE" (Ser. No. 09/215,820); U.S. Pat. No. 6,274,261

"AIR MOVER FOR A METAL-AIR BATTERY UTILIZING A VARIABLE VOLUME ENCLOSURE" (Ser. No. 09/216,118); U.S. Pat. No. 6,436,564

"AIR DELIVERY SYSTEM WITH VOLUME-CHANGEABLE PLENUM OF METAL-AIR BATTERY" (Ser. No. 09/216,660); and U.S. Pat. No. 6,346,341

"AIR MANAGER SYSTEMS FOR METAL-AIR BATTERIES UTILIZING A DIAPHRAGM OR BELLOWS" (Ser. No. 09/216,026) U.S. Pat. No. 6,475,658 are incorporated herein by reference.

TECHNICAL FIELD

The present invention relates to gas depolarized electrochemical power sources, such as metal-air batteries or fuel cells of the type that are supplied with reactive gas by an active air moving device, and more particularly relates to an air mover mechanism that utilizes a diaphragm or bellows to move air in and out of one or more air openings or to move air from an inlet to an outlet.

BACKGROUND OF THE INVENTION

Generally described, a metal-air cell, such as a zinc-air cell, uses one or more air permeable cathodes separated from a metallic zinc anode by an aqueous electrolyte. During operation of the cell, oxygen from the ambient air is converted at the one or more cathodes to produce hydroxide ions. The metallic zinc anode is then oxidized by the hydroxide ions. Water and electrons are released in this electrochemical reaction to provide electrical power.

Initially, metal-air cells found limited commercial use in devices, such as hearing aids, which required a low level of power. In these cells, the air openings which admitted air to the air cathode were so small that the cells could operate for some time without flooding or drying out as a result of the typical difference between the outside relative humidity and the water vapor pressure within the cell. However, the power output of such cells was too low to operate devices such as camcorders, cellular phones, or laptop computers. Furthermore, enlarging the air openings of a typical "button cell" was not practical because it would lead to premature failure as a result of flooding or drying out.

In order to increase the power output of metal-air cells so that they could be used to operate devices such as camcorders, cellular phones, or laptop computers, air managers were developed with a view to providing a flow of reactive air to the air cathodes of one or more metal-air cells while isolating the cells from environmental air and humidity when no output is required. As compared to conventional electrochemical power sources, metal-air cells containing air managers provide relatively high power output and long lifetime with relatively low weight. These advantages are due in part to the fact that metal-air cells utilize oxygen from the ambient air as the reactant in the electrochemical process as opposed to a heavier material such as a metal or a metallic composition. Examples of air managers are shown in U.S. Pat. Nos. 4,913,983, 5,356,729, 5,691,074 and 5,919,582.

A disadvantage of most air managers, however, is that they utilize an air moving device, typically a fan or an air pump, that occupies space that could otherwise be used for battery chemistry to prolong the life of the battery. This loss of space presents a particular challenge in attempts to provide a practical metal-air cell in small enclosures such as the "AA" cylindrical size now used as a standard in many electronic devices.

In addition to being bulky, air moving devices used in metal-air batteries also consume energy stored in the metal-air cells that might otherwise be delivered as power output to a load. Complicated electronics for controlling an air manager can increase this use of stored energy; in addition they add considerable expense. Also, as most air moving devices used in metal-air cells distribute air to a cathode plenum at low pressure, a flow path must be defined passing over all regions of the cathode surface to evenly distribute air to the entire cathode surface. Thus, the function of bringing in make up air and the function of mixing and distributing air within the battery have been separate. A further disadvantage of fans used as air moving devices in metal-air cells is that they may create noise at a level disruptive to users of devices such as cellular telephones.

As a result, while a key advantage of metal-air cells is their high energy density resulting from the low weight of the air electrode, this advantage has been compromised by the cost, space and power required for an effective air manager, and the noise it may produce. In addition, the operation of the air manager may not be necessary for all levels of power draw from the metal-air cell.

Fuel cells of the type that provide a gaseous or liquid fuel, such as hydrogen or methanol, also may benefit from an air manager that can provide air at a gas depolarized electrode while maintaining a needed hydration level in an electrolyte or hydrated membrane ("polymer electrolyte").

Therefore, there has been a need in the art for an air manager incorporating an air moving device that occupies less of the volume available for battery chemistry, is usable with advanced systems for isolating the air electrodes when power is not being drawn from the metal-air cell, is quiet, needs relatively simple controls, consumes power at a relatively low rate, and provides similar advantages for fuel cells. There is a further need for a control means for the air manager that operates the air manager when necessary during high current draw modes and causes the air manager not to operate during low current draw modes.

SUMMARY OF THE INVENTION

The present invention seeks to provide an improved gas moving device for gas depolarized cells that occupies a minimal amount of the volume available for other cell components, is usable with advanced systems for isolating the air electrodes when power is not being drawn from the cell, requires either simple or no control logic circuitry, is quiet, and consumes power at a relatively low rate.

In accordance with one aspect of the invention, this object is accomplished by placing the cell or battery of cells in a casing with at least one ventilation passageway extending from the gas electrodes to an outside gas supply. A resilient diaphragm is placed within the casing and caused to reciprocate, moving in one direction by an electrically induced force an electromagnetic field and in the opposite direction by the resiliency of the diaphragm. The movement of the diaphragm causes gas to be exchanged between the interior of the casing adjacent to the gas electrode and exterior of the casing through the ventilation passageway.

In a preferred embodiment, the present invention provides a resilient ferromagnetic diaphragm having two sides. A coil is positioned near the diaphragm in order to attract the resilient ferromagnetic diaphragm when an electromagnetic field is created by an electrical current passing through the coil. When the electrical current through the coil is switched off, the diaphragm returns to its original position due to the resiliency of the diaphragm. The resilient ferromagnetic diaphragm may be constructed of a resilient diaphragm with a ferromagnetic plate attached to one side or may be formed from a resilient ferromagnetic material.

In another embodiment, the present invention provides a resilient ferromagnetic diaphragm with two sides and a coil positioned near the diaphragm. An electrical circuit with an electrical current source is used to direct an electrical current through the coil. The current through the coil creates an electromagnetic magnetic field which attracts the diaphragm and causes it to move when a predetermined level of electrical current passes through the coil.

The electrical circuit also contains a pair of contacts with one of the contacts connected to the diaphragm. The contacts are closed when the current flow through the coil is less than a predetermined level. However, when the current flow through the coil is greater than a predetermined level, the diaphragm moves. As the diaphragm moves, the contacts are opened, thus breaking the circuit, de-energizing the coil, and allowing the resiliency of the diaphragm to return it to the original position and remaking the circuit. The de-energizing and re-energizing of the coil may be repeated to cause the diaphragm to oscillate. Also, the resilient ferromagnetic diaphragm may be constructed of a resilient diaphragm with a ferromagnetic plate attached to one side or may be formed from a resilient ferromagnetic material.

In yet another embodiment, the present invention provides an electrically activated diaphragm with two sides. An electrical circuit with an electrical current source is used to direct an electrical current through the electrically activated diaphragm. The current through the electrically activated diaphragm causes the diaphragm to deform when a predetermined level of electrical current passes through it.

The electrical circuit also contains a pair of contacts with one of the contacts connected to the diaphragm. The contacts are closed when the current flow through the electrically activated diaphragm is less than a predetermined level. However, when the current flow through the electrically activated diaphragm is greater than a predetermined level, the diaphragm deforms. As the diaphragm deforms, the contacts are opened, thus breaking the circuit, and allowing the diaphragm to return it to the original position and remaking the circuit. The de-energizing and re-energizing of the diaphragm may be repeated to cause the diaphragm to oscillate. Also, the electrically activated diaphragm may be constructed of a piezoelectric or EAPS material, or a resilient diaphragm with a strip of piezoelectric material attached to one side.

Another aspect of the invention is a method for moving air in gas depolarized cell or battery of cells by encasing the cell or battery of cells in a body having at least one ventilation passageway and reciprocating a resilient diaphragm contained in the body in one direction with an electromagnetic field and in the other direction by the resiliency of the diaphragm. By reciprocating the diaphragm, air adjacent to the air electrode is exchanged between the interior and exterior of the body. The gas depolarized cell may be either a metal-air cell or a fuel cell of the type that provide a gaseous or liquid fuel, such as hydrogen or methanol.

In a preferred embodiment, the resilient diaphragm is manipulated by positioning a coil near the diaphragm and moving the diaphragm when an electromagnetic field is created by an electrical current passing through the coil. When the electrical current through the coil is switched off, the diaphragm returns to its original position due to the resiliency of the diaphragm.

In another embodiment the manipulation of the diaphragm is controlled by positioning a coil in proximity to the resilient ferromagnetic diaphragm; providing an electrical circuit having an electrical current source; and directing electrical current from the electrical current source through the coil to create an electromagnetic magnetic field to attract the diaphragm and cause it to move when a predetermined level of electrical current passes through the coil. Next in this method the diaphragm is manipulated by providing a pair of contacts with one of the contacts connected to the diaphragm and closed when current flow through the coil is less than a predetermined level; and moving the diaphragm when the presence of current flow through the coil is greater than a predetermined level. When the diaphragm moves, the contacts open thus breaking the circuit, de-energizing the coil, and allowing the resiliency of the diaphragm to return it to the original position.

The electrical circuit may be reestablished when the contacts are closed after the diaphragm has returned to its original position. When this is done, the electromagnetic magnetic field is recreated and attracts the diaphragm, thus causing the oscillation of the diaphragm while the electrical current available to the coil is greater than a predetermined level.

Another aspect of the invention is an gas mover system for an gas depolarized power supply associated with a load having at least two modes of operation drawing different levels of current from the power supply. A casing having at least one ventilation passageway is utilized to contain one or more cells. The gas may be, for example, air containing oxygen. An air mover is positioned to move air from the exterior to the interior of the casing adjacent to an air electrode of the cell and from the interior adjacent to an air electrode of the cell to the exterior of the casing. The passageway permits a predetermined low flow rate of air from the exterior to the interior of the casing adjacent to an air electrode of the cell during a low current draw mode of operation while the air mover is inoperative. The air mover, however, becomes operative responsive to the initiation of a high current draw mode of operation in a preferred embodiment. In a preferred embodiment, a fan or a resilient reciprocating diaphragm may be used as the air mover and may be powered by the power supply.

The operation of the air mover may be determined by a controller which monitors the load on the power supply. This controller can determine if the load on the power supply corresponds to the high current draw mode of operation and operate the air mover if this condition is found. Also, the controller may be a current divider circuit designed to restrict current to an electric air pump to a magnitude sufficient not to operate the air pump during the low current draw mode and yet direct a magnitude of current to the air pump sufficient to operate during the high current draw mode. Such a circuit can operate on the breaking and remaking principle described above.

This system may be used, for example in a cellular telephone environment. The low current draw mode of the system can correspond to the stand-by mode of a cellular telephone and the high current draw mode of operation can correspond to the transmit/receive mode.

Another aspect of the invention is a method of admitting air to an gas depolarized power supply associated with a load having at least two modes of operation drawing different levels of current from the power supply.

In a preferred embodiment, this is accomplished by enclosing the power supply in a casing with at least one ventilation passageway extending through the casing; initiating the operation of an air mover responsive to the initiation of a high current draw mode of operation of the load on the power supply; and terminating the operation of the air mover during a low current draw mode of operation of the load. The ventilation passageway permits a predetermined low flow rate of air from the exterior to the interior of the casing while the air mover is inoperative.

The operation of the air mover may be determined by monitoring the load on the power supply; determining if the load corresponds to the high current draw mode of operation; and operating the air mover if the load corresponds to the high current draw mode of operation. Also, an electric air mover may be employed by restricting current to the electric air pump to a magnitude sufficient not to operate during the low current draw mode of operation and directing a magnitude of current to the electric air pump sufficient to operate during the high current draw mode of operation.

In addition, this method may be employed in a cellular telephone environment by utilizing the low current draw mode of operation during the stand-by mode of a cellular telephone and utilizing the high current draw mode of operation during the transmit/receive mode of the cellular telephone.

Yet another aspect of the invention is an air mover system for an gas depolarized cell or battery of cells where the cell or battery of cells is to provide energy for an electrical device. A casing removable from the electrical device is utilized to contain the cell or battery of cells. The casing contains at least one ventilation passageway extending through the casing that mates with the electronic device. A resilient diaphragm is placed within the electronic device and caused to reciprocate, moving in one direction by the force of an electromagnetic field and in the opposite direction by the resiliency of the diaphragm. The movement of the diaphragm causes air to be exchanged through the ventilation passageway thus moving air between the interior of the casing adjacent to the air electrode and exterior of the casing.

Other objects, features, and advantages of the present invention will become apparent upon reading the following description of exemplary embodiments, when taken in conjunction with the drawings and the claims.

DETAILED DESCRIPTION

The invention may be embodied in a metal-air battery or other type of fuel cell. It is well understood that many types of electrical devices may be powered by a metal-air battery. The cells of the metal-air battery may be similar to those disclosed in commonly owned Ser. No. 08/299,997 or in commonly owned U.S. Pat. Nos. 5,356,729 or 5,641,588 or 5,569,551, which are incorporated herein by reference. The metal-air battery may include one or more metal-air cells enclosed within a casing. Although the use of the invention with specific types of metal-air cells is disclosed, this invention should be understood as being applicable to any type of metal-air cell, whether primary or secondary, and to other types of fuel cells.

An Exemplary Operating Environment

Figure 1:
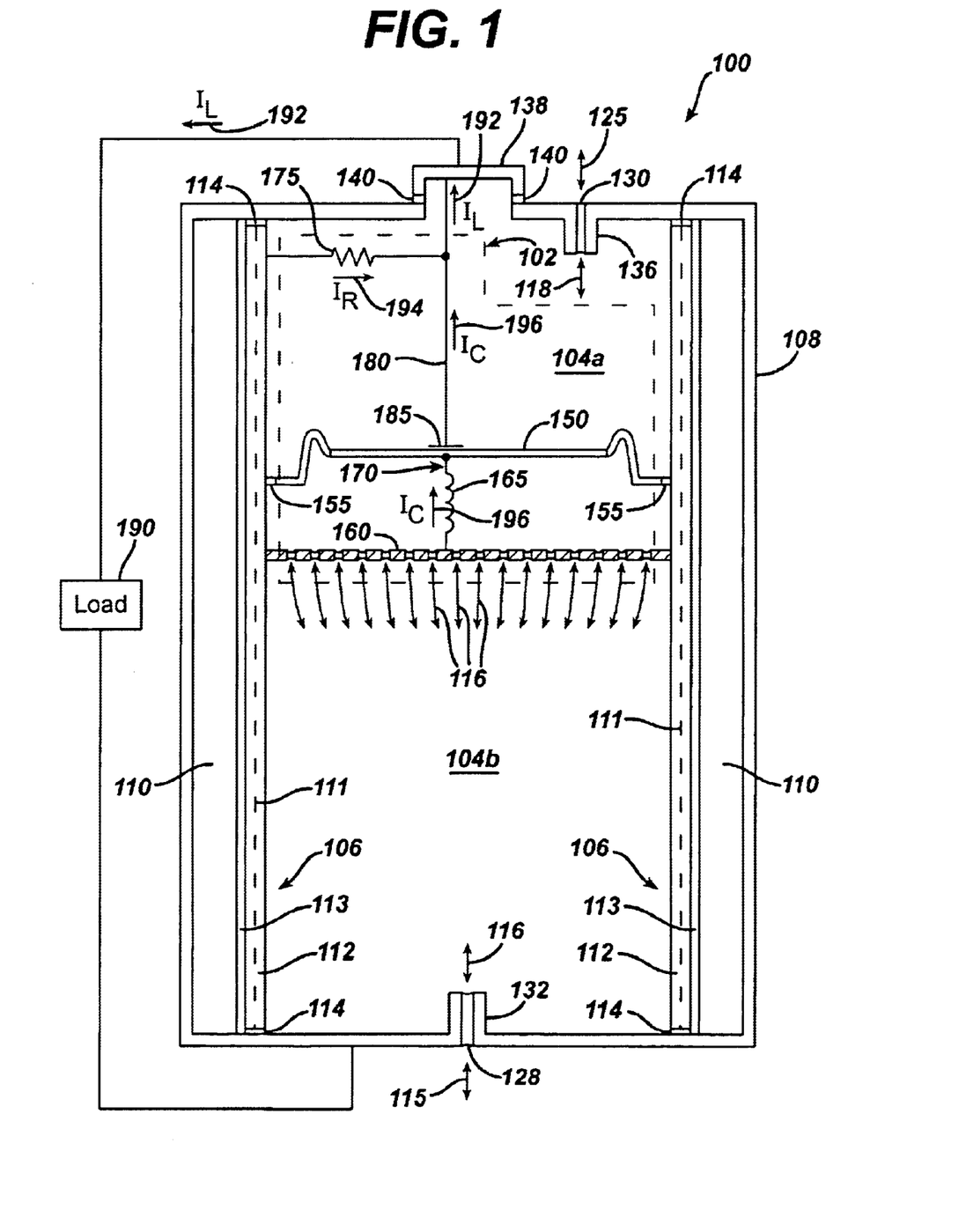
FIG. 1 is a diagrammatic axial cross-sectional view of a cylindrical battery according to a preferred embodiment of the present invention.

Referring now in more detail to the drawings, in which like numerals refer to like parts throughout the several views. FIG. 1 is a preferred embodiment of the present invention illustrating a cylindrical battery 100 with a diaphragm air moving system 102 between an upper axial air chamber 104*a* and a lower axial air chamber 104*b*. The diaphragm air moving system 102 and a metal-air cell 106 are enclosed within a conductive cylindrical casing 108. The metal-air cell 106 is composed of an anode material 110 in contact with the casing 108, and a cylindrical air cathode 112 with a separator 113 between the anode material 110 and the air cathode 112. The air cathode 112 is electrically isolated from the casing 108 by annular cathode insulators 114. In the figures, the diameter of the chambers 104*a* and 104*b* is exaggerated to show detail. In practice, the diameter is minimized.

One side of the air cathodes 112 faces the upper and lower axial air chambers 104*a* and 104*b*. The opposing side of the air cathode 112 faces the separator 113 which in turn faces the anode material 110. A diaphragm air moving system 102 is positioned in the casing 108 between an upper axial air chamber 104*a* and a lower axial air chamber 104*b*. The upper axial air chamber 104*a* and a lower axial air chamber 104*b* together provide an interior air plenum. Arrows 115, 116, 118, and 125 represent a typical circulation of air or other gaseous oxygen source into, within, and out of the casing 108 to provide reactant air flow to the air cathodes 112 as a result of operation of the air moving system or in a manner described below.

The casing 108 isolates the metal-air cell 106 from the ambient air with the exception of a plurality of ventilation openings 128 and 130. The casing preferably is a conductive metal can. Alternatively, the casing may be made of plastic, and the cell may be provided with an anode current collector and an anode terminal extending to the exterior of the casing. Preferably, upper and lower ventilation openings 130 and 128 permit the ambient air to communicate with the upper and lower axial air chambers 104*a* and 104*b* respectively. Both the upper axial air chamber 104*a* and the lower axial air chamber 104*b* must have at least one ventilation open per passageway. However the number of ventilation openings 128 and 130 is not as important as the aggregate size of the ventilation openings 128 and 130 in connection with their shape. The lower ventilation opening 128 through the casing 108 is located on bottom of the battery 100. A lower diffusion isolation tube 132 connects to the lower ventilation opening 128 and extends from the lower ventilation opening 128 into the lower axial air chamber 104b of the battery 100. The upper ventilation opening 130 through the casing 108 is located at the top of the battery 100. An upper diffusion isolation tube 136 connects to the upper ventilation opening 130, and extends from the casing 108 into the upper axial air chamber 104a of the battery 100.

As described previously, the size, number, shape, or arrangement of the lower diffusion isolation tube 132 corresponding to the lower ventilation opening 128 and the upper diffusion isolation tube 136 corresponding to upper ventilation opening 130 may be selected to further optimize the air flow to the metal-air cell 106. When taken together, the lower ventilation opening 128 and the upper ventilation opening 130 are of sufficient size to admit and expel a quantity of air into and out of the casing 108 dependent upon the metal-air cell 106 power requirements. A detailed discussion of the isolation function of the diffusion isolation tubes is provided in the section on ventilation openings below.

The diaphragm air moving system 102 provides an increased air flow into and out of the upper and lower axial air chambers 104a and 104b adjacent to the air cathode 112. The operation of the diaphragm air moving system 102 occurs during certain high current draw modes of operation of the metal-air cell 106 and ceases during low current draw modes of operation. A detailed discussion of these two modes of operation in conjunction with the initiation of the air moving system 102 is provided below.

A ferromagnetic rolling diaphragm 150 is placed across the interior of the battery 100 perpendicular to air cathode 112, and between the upper axial air chamber 104a and the lower axial air chamber 104b. The circular ferromagnetic rolling diaphragm 150 is attached to the air cathode 112 through an annular diaphragm insulator 155, thus electrically isolating the ferromagnetic rolling diaphragm 150 from the air cathode 112 at the point where it fastens to the air cathode 112. The ferromagnetic rolling diaphragm 150 may be made of a resilient material diaphragm with a ferromagnetic plate attached or may be formed of a resilient ferromagnetic material. The diaphragm may be made of various flexible materials including a thermoplastic elastomer (TPE) such as Santoprene® thermoplastic rubber available from Advanced Elastomer Systems.

In addition to the ferromagnetic rolling diaphragm 150, a perforated circular plate 160 is placed across the interior of the battery 100. The perforated plate 160 is located within the lower axial air chamber 104b, perpendicular to air cathode 112, and parallel to the ferromagnetic rolling diaphragm 150. The perforated plate 160 is not insulated from the air cathode 112, but rather is conductive and is connected to a cylindrical cathode current collector 111 placed longitudinally within the air cathode 112. The perforations in the perforated plate 160 allow air flow 116 to flow through the perforated plate and into and out of the lower axial air chamber 104b.

In order to provide a source for an electromagnetic field, a coil 165 is positioned between the ferromagnetic rolling diaphragm 150 and the perforated plate 160. One end of the coil 165 is electrically connected to the ferromagnetic diaphragm 150 through a flexible coil lead 170. The opposite end of the coil is electrically connected to the perforated plate 160. The movement of the ferromagnetic diaphragm 150 and the need for the flexible coil lead 170 is discussed below.

Figure 3A:
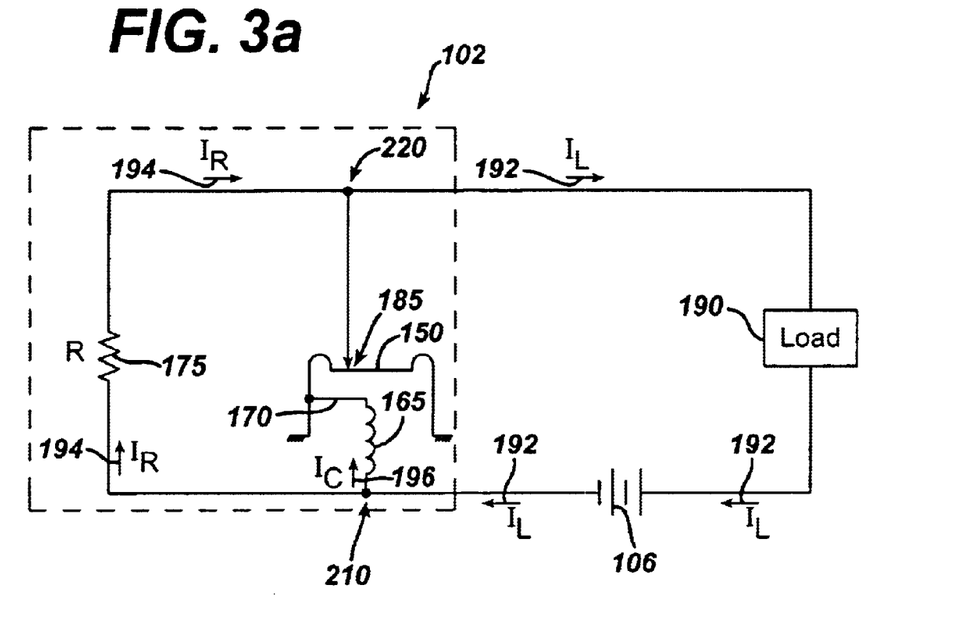
FIG. 3*a* and FIG. 3*b* are schematic diagrams of the operation of the diaphragm air moving system of the present invention.

At the top of the battery 100 is located a terminal projection 138 which is insulated from the conductive cylindrical casing 108 through the use of a terminal projection insulator 140. A contact lead 180 provides a connection between the terminal projection 138 and contacts 185 positioned to make electrical contact with the diaphragm 150 when the diaphragm is in a relaxed, upper position as shown in FIGS. 1 and 3a. A resistor 175 is placed between the cathode current collector 111 and the contact lead 180. When a load 190 is connected to the battery 100 between the terminal projection 138 and the conductive cylindrical casing 108, a load current ($I_L$) 192 is drawn from the metal-air cell 106. When the contacts 185 are closed, (that is, contacting the diaphragm 150 in its upper position) the load current ($I_L$) 192 is drawn through two parallel paths comprising a resistor path corresponding to a resistor current ($I_R$) 194 and a coil path corresponding to a coil current ($I_C$) 196. However, if the contacts 185 are open, then there is no current in the coil path. Both currents originate from the cathode current collector 111 and sum together at the contact lead 180 to equal load current ($I_L$) 192.

The resistor current ($I_R$) 194 originates from the cathode current collector 111, continues through the resistor 175 and then to contact lead 180. The coil current ($I_C$) 196 also originates with the cathode connector 111, but continues through the perforated plate 160, through coil 165 and then through the flexible coil lead 170. From the flexible coil lead 170, the coil current ($I_C$) 196 continues through the ferromagnetic rolling diaphragm 150. With the contacts 185 closed, the coil current ($I_C$) 196 continues through the contacts 185 and then to the contact lead 180. As stated previously, the resistor current ($I_R$) 194 and the coil current ($I_C$) 196 sum together in the contact lead 180 to create the load current ($I_L$) 192. The load current ($I_L$) 192 continues out of the battery 100 from the contact lead 180, through the terminal projection 138 and into the load 190.

Dual Mode Feature

During the operation of the metal-air cell 106, the load current ($I_L$) 192 will vary depending upon the demand placed upon the metal-air cell 106 by the load 190. In some electrical devices, such as cellular telephones, the magnitude of the load current ($I_L$) 192 can be characterized as having two levels, herein described as a low current draw mode and a high current draw mode.

During the low current draw mode, the upper diffusion isolation tube 136 along with the lower diffusion isolation tube 132 permit a predetermined low flow rate of air into the upper and lower axial air chambers 104a and 104b. This predetermined low flow rate of air is sufficient to service the needs of the air cathode 112 at a level which enables the battery 100 to provide energy to the load 190, when the load 190 demands a load current 192 corresponding to a low current draw mode. Since the upper diffusion isolation tube 136 along with the lower diffusion isolation tube 132 are sufficient to provide air to the air cathode 112, the operation of the diaphragm air moving system 102 is not necessary during the low current draw mode.

During the high current draw mode, however, the upper diffusion isolation tube 136 along with the lower diffusion isolation tube 132 are not sufficient alone to service the needs of the air cathode 112. In order to provide the necessary flow rate of air sufficient to service the needs of the air cathode 112 during the high current draw mode, the diaphragm air moving system 102 must be engaged.

Figure 2:
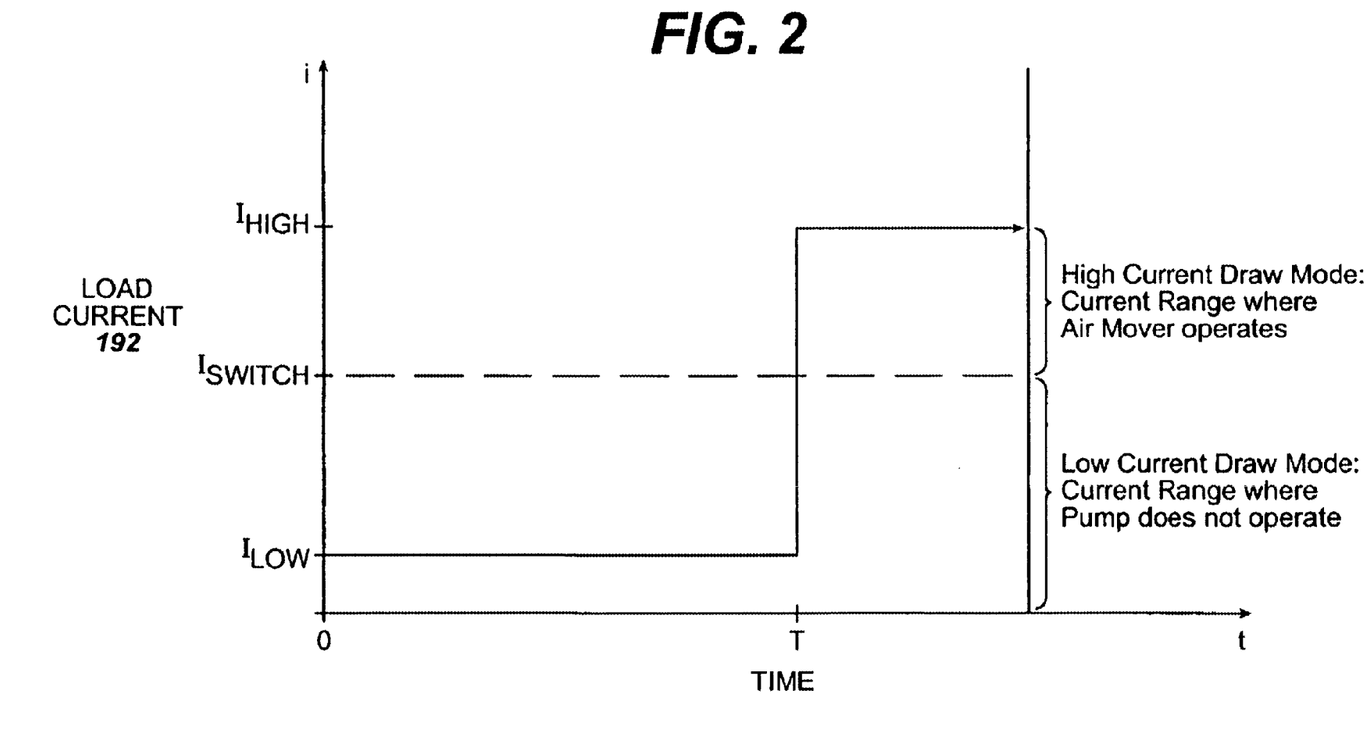
FIG. 2 is a graphical representation of the dual mode feature of the present innovation.

FIG. 2 illustrates the dual mode feature of the battery 100 and the initiation of the diaphragm air mover 102. The graph shows that the load current 192 remains at a magnitude $I_{LOW}$ for a time between t=0 and t=T. At time t=T, the load current 192 rapidly moves from $I_L=I_{LOW}$ to $I_L=I_{HIGH}$. As the load current 192 makes this transition, it passes a magnitude $I_{SWITCH}$ that is the level of load current 192 at which the operation of the diaphragm air moving system 102 is initiated. $I_{HIGH}$ is of a greater magnitude than $I_{SWITCH}$. For time t>T the diaphragm air moving system 102 operates since the load current 192 is greater than $I_{SWITCH}$.

For an example of the operation of the dual mode feature, consider a cellular telephone. When a cellular telephone is in the stand-by mode, the energy consumed is minimized. The load current 192 ($I_L$) during the stand-by mode corresponds to the $I_{LOW}$ level illustrated in FIG. 2. At a point in time t=T, the cellular telephone either receives a call or a user places a call using the cellular telephone. At this point, the energy need begins at a low current draw mode corresponding to the stand-by mode and transitions to a high current draw mode corresponding to the transmit mode of the cellular telephone. During this transition, the load current 192 ($I_L$) passes through a level $I_{SWITCH}$ which is the level of load current 192 at which the operation of the diaphragm air moving system 102 is initiated. Therefore, the diaphragm air moving system 102 is engaged to provide the necessary flow rate of air sufficient to service the needs of the air cathode 112 during the transmit mode of the cellular telephone.

Operation of the Air Mover

Referring back to FIG. 1, if the load 190 is less than a specified magnitude corresponding to the low current draw mode, a resulting coil current ($I_C$) 196 will be drawn which is less than a predetermined level and will not create sufficient electromagnetic force to move the diaphragm 150 and thus will not cause the oscillation of the ferromagnetic rolling diaphragm 150. If, however, the load 190 is greater than a specified magnitude corresponding to a high current draw mode, a resulting coil current ($I_C$) 196 will be drawn which is greater than a predetermined level and sufficient to oscillate the ferromagnetic rolling diaphragm 150. The predetermined level of coil current ($I_C$) 196 capable of causing the oscillation of the ferromagnetic rolling diaphragm 150, and below which the ferromagnetic rolling diaphragm 150, does not oscillate, can be determined by the size of resistor 175 in coordination with load 190.

For example, the size of the coil 165 can be determined by the coil size necessary to create a magnetic field large enough to sufficiently pull the ferromagnetic rolling diaphragm 150. Next, given the magnitude of load current ($I_L$) 192 at which the battery 100 needs the increased air flow, the resistor 175 is sized in order to cause a sufficient coil current ($I_C$) 196 for the high current draw mode. The coil current ($I_C$) 196 for the high current draw mode must be of sufficient magnitude to create a magnetic field large enough to sufficiently pull the ferromagnetic rolling diaphragm 150. However, if the load current ($I_L$) 192 falls sufficiently below this level, the corresponding coil current ($I_C$) 196 must not be of sufficient magnitude to create a magnetic field large enough to sufficiently pull the ferromagnetic rolling diaphragm 150.

Figure 3B:
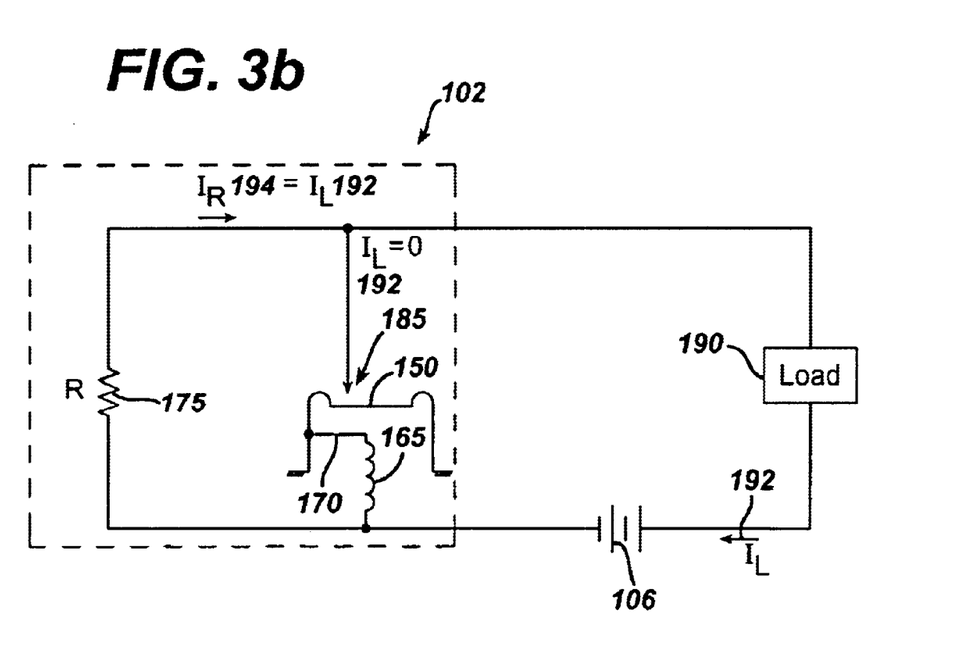

Turning now to FIGS. 3a and 3b which illustrate the oscillation of the ferromagnetic rolling diaphragm 150 and the operation of the diaphragm air moving system 102. In FIG. 3a, load current ($I_L$) 192 is drawn from the cell 306 when load 190 is connected to battery 100. The cell 306 may be comprised of an gas depolarized electrochemical power source, such as a metal-air battery, or may be comprised of fuel cells of the type that are supplied with reactive gas such as hydrogen or methanol by an active air moving device. Load current ($I_L$) 192 divides at node 210 into the coil current ($I_C$) 196 and the resistor current ($I_R$) 194. Once the two currents pass through their respective parallel paths, they sum together at node 220 to a magnitude equal to load current ($I_L$) 192. After node 220, the load current ($I_L$) 192 continues to serve load 190 and then returns to the cell 306, thus completing the electrical circuit.

During a high current draw mode, as discussed above, it is necessary to engage the diaphragm air moving system 102 and cause the ferromagnetic rolling diaphragm 150 to oscillate. In order to accomplish this, the coil current ($I_C$) 196 must be of a magnitude to cause the coil 165 to create a magnetic field great enough to attract the ferromagnetic rolling diaphragm 150. Given the high current draw mode, the ferromagnetic rolling diaphragm 150 is pulled toward the coil 165, and the contacts 185 open. The flexible coil lead 170 allows the coil 165 to remain electrically connected to the ferromagnetic rolling diaphragm 150 during movement. FIG. 3b is an illustration of the system with the contacts 185 open. After the contacts open, the coil current ($I_C$) 196 will go to zero, though not instantaneously. When the coil current ($I_C$) 196 is at zero, the magnetic field attracting the ferromagnetic rolling diaphragm 150 will cease. With the magnetic field no longer present, the resiliency of the ferromagnetic rolling diaphragm 150 will return the ferromagnetic rolling diaphragm 150 to its original position.

When the ferromagnetic rolling diaphragm 150 returns to its original position, the contacts 185 which were open will now re-close. With the contacts 185 now in the closed position, the coil current ($I_C$) 196 will be reestablished thus reestablishing the magnetic field and once again attracting the ferromagnetic rolling diaphragm 150. This process will repeat and cause the ferromagnetic rolling diaphragm 150 to oscillate as long as the coil current ($I_C$) 196 is available to the coil 165 and is greater or equal to a predetermined level sufficient to attract the ferromagnetic rolling diaphragm 150. In addition, the coil and resistor can be tuned to cause the ferromagnetic rolling diaphragm 150 to oscillate at a frequency not within the audible range of the human ear. This will allow the air mover to operate quietly with respect to human detection.

It should be understood that the air moving system of the present invention can be applied to an electrical device having a single mode of operation. In this case, the low current draw mode occurs when the device is "off" and draws no current.

Second Embodiment of the Present Invention

Figure 4:
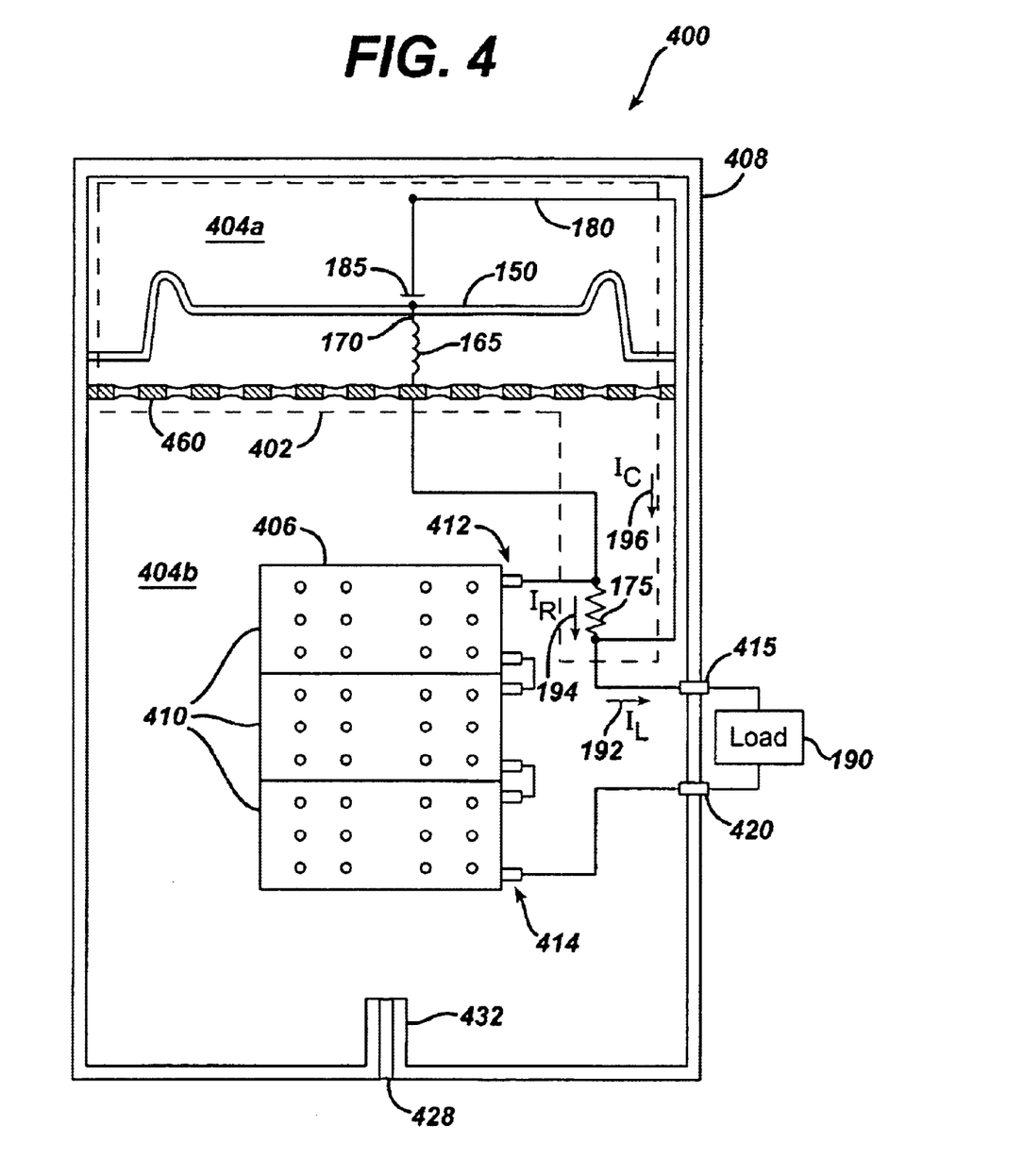
FIG. 4 is a diagrammatic axial cross-sectional view of a battery according to a second embodiment of the present invention.

Turning now to FIG. 4 illustrating a second embodiment of the present invention comprising a battery 400 with a diaphragm air moving system 402 between an upper chamber 404a and a lower chamber 404b. The diaphragm air moving system 402 and a metal-air battery of cells 406 are enclosed within a prismatic casing 408. The metal-air battery of cells 406 having a cathode terminal 412 and an anode terminal 414, includes a plurality of metal-air cells 410. The diaphragm air moving system 402 is positioned in the casing 408 between the upper chamber 404a and the lower chamber 404b.

The casing 408 isolates the metal-air battery of cells 406 from the ambient air with the exception of a ventilation opening 428. The casing preferably is a plastic material, or a metal can insulated from the interior components. Preferably, the ventilation opening 428 permits the ambient air to communicate with the lower chamber 404b. The lower chamber 404b must have at least one ventilation opening 428; the number of ventilation openings is not as important as the aggregate size of the ventilation openings in connection with their shape. The lower ventilation opening 428 is of sufficient size to admit and expel a quantity of air into and out of the casing 408 dependent upon the metal-air battery of cell's 406 power requirements.

The ventilation opening 428 through the casing 408 is located on bottom of the battery 400. A diffusion isolation tube 432 connects to the ventilation opening 428 and extends from the lower ventilation opening 428 into the lower chamber 404b of the battery 400.

The diaphragm air moving system 402 provides an increased air flow into and out of the lower chamber 404b adjacent to the air cathodes of the metal-air cells 410. The operation of the diaphragm air moving system 402 occurs during certain high current draw modes of operation of the metal-air battery of cells 406 and ceases during low current draw modes of operation. A detailed discussion of these two modes of operation has been discussed previously.

A conductive ferromagnetic rolling diaphragm 150 is placed across the interior of the battery 400 above the lower chamber 404b. The ferromagnetic rolling diaphragm 150 is attached to the casing 408. The diaphragm may be formed in a rectangular shape, or may be a circular or ellipse mounted in a rectangular frame. In addition to the ferromagnetic rolling diaphragm 150, a perforated plate 160 is placed across the interior of the battery 400. The perforated plate 160 is located within the lower chamber 404b and parallel to the ferromagnetic rolling diaphragm 150. The perforated plate 160 and the ferromagnetic rolling diaphragm 150 are not electrically connected to the casing 408. The perforations in the perforated plate 160 allow air to flow through the perforated plate and into and out of the lower chamber 404b.

In order to provide a source for an electromagnetic field, a coil 165 is positioned between the ferromagnetic rolling diaphragm 150 and the perforated plate 160. One end of the coil 165 is electrically connected to the ferromagnetic diaphragm 150 through a flexible coil lead 170. The opposite end of the coil is electrically connected to the perforated plate 160.

On the exterior of the battery 400 are located a cathode terminal projection 415 and an anode terminal projection 420 which are insulated form the casing 408. When a load 190 is connected to the battery 400 between the terminal projections 415 and 420, a load current ($I_L$) 192 is drawn from the metal-air battery of cells 406. The load current ($I_L$) 192 is drawn through two parallel paths comprising a resistor path corresponding to a resistor current ($I_R$) 194 and a coil path corresponding to a coil current ($I_C$) 196. Both currents originate from the cathode terminal 412 and sum together at the cathode terminal projection 415 to equal load current ($I_L$) 192.

The resistor current ($I_R$) 194 originates from the cathode terminal 412, continues through the resistor 175 and then to the cathode terminal projection 415. The coil current ($I_C$) 196 also originates with the cathode terminal 412, but continues through the perforated plate 160, through coil 165 and then through the flexible coil lead 170. From the flexible coil lead 170, the coil current ($I_C$) 196 continues through the ferromagnetic rolling diaphragm 150. If the contacts 185 are closed, the coil current ($I_C$) 196 continues through the contacts 185 and then to the contact lead 180. As stated previously, the resistor current ($I_R$) 194 and the coil current ($I_C$) 196 sum together in the cathode terminal projection 415 to create the load current ($I_L$) 192. The load current ($I_L$) 192 continues out of the battery 400 from the cathode terminal projection 415, and into the load 190. The diaphragm air moving system 402 operates in similar fashion to the system discussed in the sections on the operation of the air mover and the dual mode feature above.

Third Embodiment of the Present Invention

Figure 5:
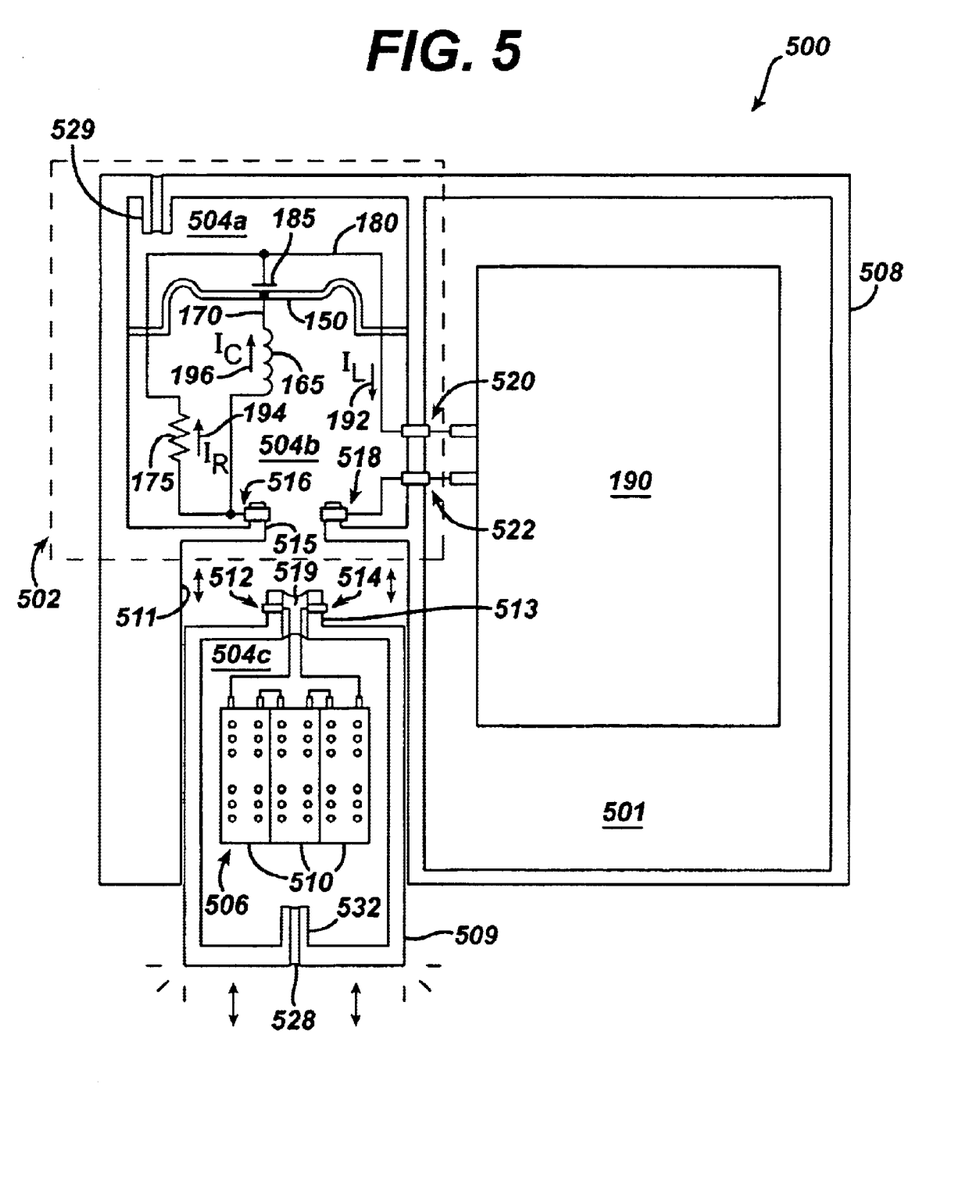
FIG. 5 is a diagrammatic axial view of a battery according to a third embodiment of the present invention.

FIG. 5 illustrates a third embodiment of the present invention comprising an electrical device 500. In this embodiment an air moving system 502 is contained within the electrical device 500 and not within a metal-air battery. The electrical device casing 508 defines a load chamber 501 for the electrical components of the device and a diaphragm air moving system 502 which comprises an upper chamber 504a and a lower chamber 504b separated by a diaphragm 150. The chamber 504b is atmospherically isolated from the other chambers. The diaphragm air moving system 502 is enclosed within the electrical device casing 508.

A metal-air battery 506 is contained in a cylindrical or prismatic battery casing 509 which is mateably received within a battery chamber 511 defined in to the electrical device casing 508 adjacent to the lower air mover chamber 504b. The battery casing 509 includes one or more metal-air cells 510, and defines a projection 513 that is tightly but moveably received within a mating opening 515 of the chamber 504b when the battery casing 509 is inserted into the chamber 511. The projection 513 includes a battery cathode terminal 512 and a battery anode terminal 514 positioned and spaced apart on the sides of the projection. As battery casing 509 slides completely into electrical device casing 508, the battery cathode terminal 512 makes electrical contact with an air mover cathode terminal 516 and the battery anode terminal 514 makes electrical contact with an air mover cathode terminal 518 positioned within the opening 515. The projection 519 defines an isolation passageway 514 into the battery housing 509.

Once the battery casing 509 has been completely mated with casing 508, the cells of the metal-air battery 506 are isolated from the ambient air with the exception of a ventilation opening 528. However, the seal between the projection 513 and the opening 515 need not be air tight. The casings 508 and 509 are preferably made of a plastic material, or are made of metal insulated from the interior components. The battery casing 509 optionally may be held in chamber 511 by a door, latch, detent, or the like (not shown). The ventilation opening 528 permits the ambient air to communicate with a battery chamber 504c. The ventilation opening 528 through the battery casing 509 is located on on a surface exposed to the ambient air. A diffusion isolation tube 532 connects to the ventilation opening 528 and extends from the lower ventilation opening 528 into the batter chamber 504c of the battery casing 509. The battery chamber 504c must have at least one ventilation opening 528; and associated isolation passageway 532 the number of ventilation openings is not as important as the aggregate size of the ventilation openings in connection with their shape. The lower ventilation opening 528 and associated isolation tube 532 are of sufficient size to admit and expel a quantity of air into and out of the casing 509 dependent upon the metal-air battery of cell's 506 power requirements. Air is caused to communicate between lower air mover chamber 504b and the battery chamber 504c through the passageway 519 when the air mover is operating.

The diaphragm air moving system 502 provides an increased air flow into and out of the battery chamber 504c adjacent to the air cathodes of the metal-air cells 510. The operation of the diaphragm air moving system 502 occurs during certain high current draw modes of operation of the metal-air battery of cells 506 and ceases during low current draw modes of operation. These two modes of operation have been discussed previously.

The conductive ferromagnetic rolling diaphragm 150 is placed within the electrical device 500 to separate the upper and lower chambers 504a and 504b. The ferromagnetic rolling diaphragm 150 is attached to the casing 508. If the chambers are prismatic, the diaphragm may be formed in a rectangular shape, or may be a circular or ellipse mounted in a rectangular frame. If the chambers are cylindrical, the diaphragm is preferably circular. The ferromagnetic rolling diaphragm 150 is not electrically connected to the casing 508. A vent 529 equalizes pressure in the upper chamber 504a. The vent 529 can lead either to the outside of the device casing 508 as shown, or to the load chamber 501 of the casing 508.

In order to provide a source for an electromagnetic field, a coil 165 is positioned in proximity to the ferromagnetic rolling diaphragm 150. One end of the coil 165 is electrically connected to the ferromagnetic diaphragm 150 through a flexible coil lead 170. The opposite end of the coil is electrically connected to the air mover cathode terminal 516. It should be understood that the coil can be placed on either side of the diaphragm, in this as well as previous embodiments.

Through the wall of the lower chamber 504b are located a cathode terminal projection 520 and an anode terminal projection 522 which are insulated from the casing 508. When a load 190 is connected between the terminal projections 520 and 522, a load current ($I_L$) 192 is drawn from the metal-air battery of cells 506. The load current ($I_L$) 192 is drawn through two parallel paths comprising a resistor path corresponding to a resistor current ($I_R$) 194 and a coil path corresponding to a coil current ($I_C$) 196. Both currents originate from the battery cathode terminal 512 and sum together at the cathode terminal projection 520 to equal load current ($I_L$) 192.

The resistor current ($I_R$) 194 originates from the battery cathode terminal 512, continues through the resistor 175 and then to the cathode terminal projection 520. The coil current ($I_C$) 196 also originates with the cathode terminal 512, but continues through the coil 165 and then through the flexible coil lead 170. From the flexible coil lead 170, the coil current ($I_C$) 196 continues through the ferromagnetic rolling diaphragm 150. If the contacts 185 are closed, the coil current ($I_C$) 196 continues through the contacts 185 and then to the contact lead 180. As stated previously, the resistor current ($I_R$) 194 and the coil current ($I_C$) 196 sum together in the cathode terminal projection 520 to create the load current ($I_L$) 192. The load current ($I_L$) 192 continues out of the the cathode terminal projection 520 and into the load 190. The diaphragm air moving system 502 operates in similar fashion to the system discussed in the sections on the operation of the air mover and the dual mode feature above.

Fourth Embodiment of the Present Invention

Figure 6:
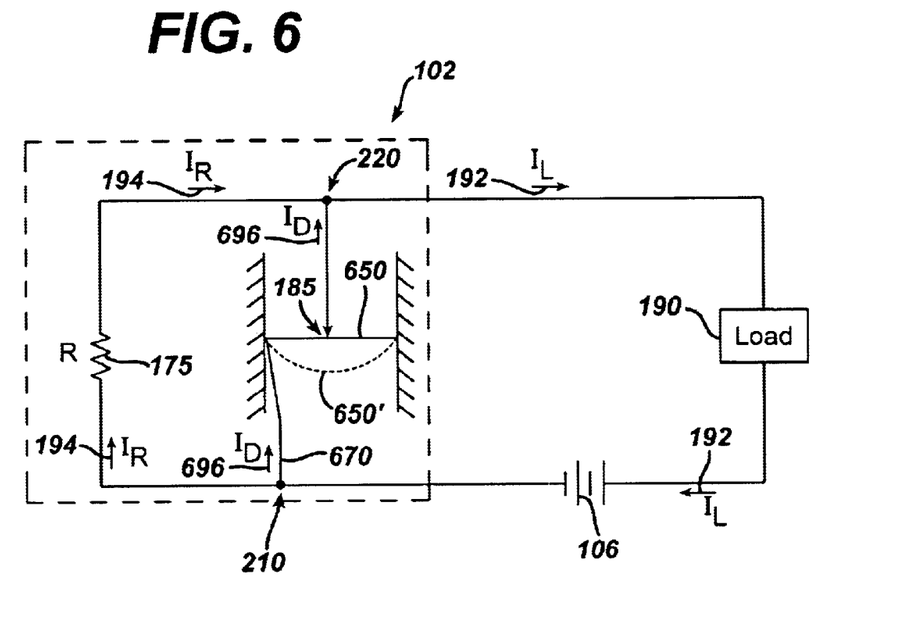
FIG. 6 is a schematic diagrams of the operation of the diaphragm air moving system of the present invention utilizing a piezoelectric diaphragm.

FIG. 6 illustrates an alternative to the diaphragm 150, namely, a electrically activated diaphragm 650, and the operation of the diaphragm 650 in the air moving system 102. The electrically activated diaphragm 650 can be made of flexible piezoelectric material, electrostatic material, or electroactive polymers (EAPS). Examples of EAPS include bending actuators or ionomers and longitudinal electrostatically driven polymers. Bending actuators or ionomers can include perfluorinated ion exchange membrane platinum composites (IMPC) based on a processed Nafion® film manufactured by DuPont. EAPS can bend, stretch, extend, or displace in a predetermined direction in response to an applied electrical current or voltage. Those skilled in the art will be familiar with the various methods used to manufacture EAPS into sheets usable as a diaphragm. Furthermore, those skilled in the art will realize that EAPS provide greater response time, lower material density, lower power consumption, improved fatigue characteristics, mass production capabilities, and the lack of poling needed when compared to conventional piezoelectric materials, as well as cost and space savings advantages over other conventional materials.

Referring to FIG. 6, the load current ($I_L$) 192 is drawn from metal-air cell 106 when load 190 is connected to battery 100. Load current ($I_L$) 192 divides at node 210 into the diaphragm current ($I_D$) 696 and the resistor current ($I_R$) 194. Once the two currents pass through their respective parallel paths, they sum together at node 220 to a magnitude equal to load current ($I_L$) 192. After node 220, the load current ($I_L$) 192 continues to serve load 190 and then returns to the metal-air cell 106, thus completing the electrical circuit.

During a high current draw mode, as discussed above, it is necessary to engage the diaphragm air moving system 102 and cause the electrically activated diaphragm 650 to oscillate. In order to accomplish this, the diaphragm current ($I_D$) 696 must be of a magnitude to cause the electrically activated diaphragm 650 to deform. In the presence of this high current draw mode, the electrically activated diaphragm 650 is deformed in such a way as to pull the electrically activated diaphragm 650 away from the contacts 185 into a position shown in dashed lines as 650', thus causing the contacts to open. The flexible diaphragm lead 670 allows the electrically activated diaphragm 650 to remain electrically connected to the node 210 during movement of the electrically activated diaphragm 650. After the contacts 185 open, the diaphragm current ($I_D$) 696 will go to zero. When the diaphragm current ($I_D$) 696 is at zero, the electric current causing the diaphragm to deform will cease. With this current no longer present, the electrically activated diaphragm 650 will return to its original position.

When the electrically activated diaphragm 650 returns to its original position, the contacts 185 will now re-close. With the contacts 185 now in the closed position, the diaphragm current ($I_D$) 696 will be reestablished thus reestablishing the current through the electrically activated diaphragm 650 and once again deforming the electrically activated diaphragm 650. This process will repeat and cause the electrically activated diaphragm to oscillate between the solid and dashed line positions as long as the diaphragm current ($I_D$) 696 is available to the electrically activated diaphragm 650 and is greater or equal to a predetermined level sufficient to deform the electrically activated diaphragm 650. In addition, the circuit can be tuned to cause the electrically activated diaphragm 650 to oscillate at a frequency not within the audible range of the human ear. This will allow the air mover to operate quietly with respect to human detection.

Diaphragm Activation Current

It should be understood from the foregoing that the air moving system of the present invention can be applied to an electrical device having a single mode of operation. In this case, the device either is "off" and draws no current, or is in a high current draw mode. Referring to FIG. 3a, the coil current $I_C$ 196 needed to oscillate the conductive ferromagnetic diaphragm 150 may typically be less than or equal to 50 mA, and preferably about 20 mA. The voltage across the coil necessary for oscillation is approximately 1 V when taken in conjunction with the aforementioned currents, but may vary depending on the characteristics of the coil.

Referring to FIG. 6, the minimum diaphragm current $I_D$ 696 needed to oscillate an electrically activated diaphragm 650 when the diaphragm is made of a piezoelectric material may typically be less than or equal to about 1 mA, and preferably about 0.1 to 0.2 mA. Similarly, the minimum current $I_D$ needed to oscillate an EAPS type diaphragm may typically fall within a range between about 50 mA and 1 mA, and preferably within a range between about 20 mA and 0.1 mA. The voltage across these types diaphragms necessary for oscillation is approximately 5 V when taken in conjunction with the aforementioned currents, again depending on the characteristics of the diaphragm.

In the case of a battery-powered device having two modes of operation as described above, the isolation passageways are sized to allow a selected level of air flow when the air mover is off. For example, consider a cellular telephone application where the stand-by mode draws approximately 5 mA and the transmit mode draws as much as 1 A. In the embodiment utilizing the coil-actuated conductive ferromagnetic diaphragm, the threshold current necessary to oscillate the diaphragm can be approximately 20 mA. In this case, the diffusion tubes should be designed to allow enough air into the air chamber to maintain approximately a 10% 02 content within the air chamber. In order to maintain this 02 content with two diffusion tubes, the diffusion tubes should be designed to have a cross sectional area to length ratio of approximately 0.03. Of course, consistent with standard gas diffusion laws, the ratio for each tube would change if only one diffusion tube is used or if more than one cell is being isolated by the tube or tubes. When the cellular telephone is in the stand-by mode, the diffusion tubes supply sufficient oxygen without an air mover. However, when the cellular telephone transitions from the stand-by mode to the transmit mode, the current draw passes through the threshold and the air mover becomes operational.

Ventilation Openings

In the case of the single mode embodiment, in which the electrically powered device is either on or off, the isolating passageways 132, 136, 432, 532, and 519 described above, are preferably constructed and arranged to allow a sufficient amount of airflow therethrough while the air moving device is operating so that a sufficient output current, typically at least 50 ma, and preferably at least 130 ma can be obtained from the metal-air cells. In addition, the isolating passageways are preferably constructed to limit the airflow and diffusion therethrough to a level consistent with the needs of the battery-powered product to which the cells are connected. In the simplest case, when the device has only a single "on" mode, the isolation passageway is sized such that the drain current that the metal-air cells are capable of providing to a load while the air moving device is not forcing airflow through the isolating passageways is smaller than the output current by a factor of about 50 or greater. In addition, the isolating passageways are preferably constructed to provide an "isolation ratio" of more than 50 to 1.

The "isolation ratio" is the ratio of the rate of water loss or gain by a cell while its oxygen electrodes are fully exposed to the ambient air, as compared to the rate of the water loss or gain of the cell while its oxygen electrodes are isolated from the ambient air, except through one or more limited openings. For example, given identical metal-air cells having electrolyte solutions of approximately thirty-five percent (35%) KOH in water, an internal relative humidity of approximately fifty percent (50%), the ambient air having a relative humidity of approximately ten percent (10%), and no fan-forced circulation, the water loss from a cell having an oxygen electrode fully exposed to the ambient air should be more than 100 times greater than the water loss from a cell having an oxygen electrode that is isolated from the ambient air, except through one or more isolating passageways of the type described above. In this example, an isolation ratio of more than 100 to 1 should be obtained.

More specifically, each of the isolating passageways preferably has a width that is generally perpendicular to the direction of flow therethrough, and a length that is generally parallel to the direction of flow therethrough. The length and the width are selected to substantially eliminate airflow and diffusion through the isolating passageways while the air moving device is not forcing airflow through the isolating passageways. The length is greater than the width, and more preferably the length is greater than about twice the width. The use of larger ratios between length and width are preferred. Depending upon the nature of the metal-air cells, the ratio can be more than 200 to 1. However, the preferred ratio of length to width is about 10 to 1.

The isolating passageways could form only a portion of the path air must take between the ambient environment and the oxygen electrodes. Each of the isolating passageways may be defined through the thickness of the battery housing or cell case, but preferably they are in the form of tubes as described above. In either case, the isolating passageways may be cylindrical, and for some applications each can have a length of about 0.3 to 2.5 inches or longer, with about 0.88 to 1.0 inches preferred, and an inside diameter of about 0.03 to 0.3 inches, with about 0.09 to 0.19 inches preferred. The total open area of each isolating passageway for such applications, measured perpendicular to the direction of flow therethrough, is therefore about 0.0007 to 0.5 square inches. In other applications, such as small cylindrical cells, the isolating passageways each can have a length of about 0.1 to 0.3 inches or longer, with about 0.1 to 0.2 inches preferred, and an inside diameter of about 0.01 to 0.05 inches, with about 0.015 inches preferred.

In the case of the dual mode embodiment in which the electrically powered device has a standby mode powered by the cell or cells without operation of the air mover, the diffusion tubes are opened somewhat, to a larger ratio of cross sectional area to length. For this embodiment, the isolation ratio preferably may be as low as about 20:1. In this way, some cell life is compromised in order to provide the dual mode operation of the cells. The needed ratio of cross sectional area to length for each diffusion tube depends on the amount of current desired in the stand-by mode, the number of tubes, and amount of air cathode area of the one or more cells within a battery housing isolated by the tubes, and can be calculated based on the laws or gas diffusion and the electrochemical reactions at the cathode, known to those skilled in the art. These laws can be used to demonstrate that 107.2 amp-hours can be produced per mole of oxygen in the air admitted through the tubes to the cathode.

The preferred dimensions for a particular application will be related to the geometry of the passageways and the cathode plenums, the particular air mover utilized, and the volume or air needed to operate the cells at a desired level.

The isolating passageways are not necessarily cylindrical, as any cross-sectional shape that provides the desired isolation is suitable. The isolating passageways need not be uniform along their length, so long as at least a portion of each isolating passageway is operative to provided the desired isolation. Further, the isolating passageways may be straight or curved along their length.

In view of the foregoing, it will be appreciated that the invention provides an improved air moving device for metal-air cells that occupies a minimal amount of the volume available for battery chemistry, is usable with advanced systems for isolating the air electrodes when power is not being drawn from the metal air cell, requires either simple or no control logic circuitry, is quiet, and consumes power at a relatively low rate. Further, the system is responsive to a dual level load, detecting the change in the load level and activating the air mover during the high current draw mode and de-activating the air mover during the low current draw mode. It will be understood that the preferred embodiment has been disclosed by way of example, and that other modifications may occur to those skilled in the art without departing from the scope and spirit of the appended claims.

The invention claimed is:

1. A system for manipulating a diaphragm air mover, the system comprising:

a resilient ferromagnetic diaphragm formed from a resilient ferromagnetic material and having two sides, the diaphragm having a first position; and a coil positioned in proximity to the diaphragm, the coil operative to attract the diaphragm and thus move the diaphragm from the first position to the second position when an electrical current passes through the coil, wherein the diaphragm returns to the first position when the current no longer passes through the coil.

2. A system for controlling the manipulation of a diaphragm air mover, the system comprising:

a resilient ferromagnetic diaphragm having two sides, wherein the diaphragm is in a first position;

a coil positioned in proximity to the diaphragm;

an electrical circuit having an electrical current source and directing electrical current through the coil thus creating an electromagnetic magnetic field operative to attract the diaphragm and cause the diaphragm to move from the first position to a second position when a level of electrical current that is higher than a predetermined level of electrical current passes through the coil; and a pair of contacts in the circuit, one of the contacts being connected to the diaphragm, and the contacts being closed when current flow through the coil is less than the predetermined level such that the presence of current flow through the coil greater than the predetermined level moves the diaphragm, breaking the circuit, de-energizing the coil, and allowing the resiliency of the diaphragm to return the diaphragm to the first position, remaking the circuit.

3. The system of claim 2, wherein the resilient ferromagnetic diaphragm comprises a resilient diaphragm with a ferromagnetic plate attached to one side.

4. The system of claim 2, wherein the resilient ferromagnetic diaphragm is formed of a resilient ferromagnetic material.

5. The system of claim 2, wherein the electrical circuit is reestablished when the contacts are closed after the resilient ferromagnetic diaphragm has returned to its first position thus recreating an electromagnetic magnetic field operative to attract said resilient ferromagnetic diaphragm and causing the oscillation of said resilient ferromagnetic diaphragm while the electrical current available to said coil is greater than said predetermined level.

6. A method for manipulating a diaphragm air mover, the method comprising:

positioning a coil in proximity to a resilient ferromagnetic diaphragm in a first position and formed of a resilient ferromagnetic material, the coil being operative to attract the diaphragm; and moving the diaphragm from the first position to a second position when an electrical current passes through the coil;

wherein the diaphragm returns to the first position when the electrical current no longer passes through the coil.

7. A method for controlling the manipulation of a diaphragm air mover, the method comprising:

positioning a coil in proximity to a resilient ferromagnetic diaphragm, the resilient ferromagnetic diaphragm having two sides and being in a first position;

providing an electrical circuit having an electrical current source;

directing electrical current from the electrical current source through the coil, thus creating an electromagnetic magnetic field operative to attract the diaphragm and cause the diaphragm to move from the first position to a second position when a level of electrical current that is higher than a predetermined level of electrical current passes through the coil;

providing a pair of contacts in the circuit, one of the contacts being connected to the diaphragm, and the contacts being closed when current flow through the coil is less than the predetermined level; and moving the diaphragm when the presence of current flow through the coil is greater than the predetermined level, thus breaking the circuit, de-energizing the coil, and allowing the resiliency of the diaphragm to return the diaphragm to the first position and remake the circuit.

8. The method of claim 7, wherein the resilient ferromagnetic diaphragm comprises a resilient diaphragm with a ferromagnetic plate attached to one side.

9. The method of in claim 7, wherein the resilient ferromagnetic diaphragm is formed of a resilient ferromagnetic material.

10. The method of claim 7, wherein the electrical circuit is reestablished when the contacts are closed after the resilient ferromagnetic diaphragm has returned to the first position, thus recreating an electromagnetic magnetic field operative to attract the resilient ferromagnetic diaphragm and causing the oscillation of the resilient ferromagnetic diaphragm while the electrical current available to the coil is greater than the predetermined level.

11. A system for manipulating a diaphragm gas mover to provide a flow of air to an air-fueled device, the system comprising:

an electrically activated diaphragm in a first position;

a first electrical contact in contact with the diaphragm; and a second electrical contact in contact with the first electrical contact through the diaphragm when the diaphragm is in the first position, wherein when electrical current is passed through the diaphragm, the current deforms the diaphragm into a second position in which the first electrical contact no longer contacts the second electrical contact through the diaphragm, such that the diaphragm returns to the first position, wherein the movement of the diaphragm provides a flow of air to the air-fueled device.

12. The system of claim 11, wherein the electrically activated diaphragm is comprised of a piezoelectric material.

13. The system of claim 11, wherein the electrically activated diaphragm comprises a resilient diaphragm with a strip of piezoelectric material attached to one side.

14. The system of claim 11, wherein the electrically activated diaphragm is comprised of an electrostatic material.

15. The system of claim 11, wherein the electrically activated diaphragm comprises a resilient diaphragm with a strip of an electrostatic material attached to one side.

16. A system for controlling the manipulation of a diaphragm gas mover, the system comprising:
- an electrically activated diaphragm in a first position and having two sides;
- an electrical circuit having an electrical current source and directing electrical current through the electrically activated diaphragm operative to deform the diaphragm and cause the diaphragm to move from the first position to a second position when a level of electrical current that is higher than a predetermined level of electrical current passes through the electrically activated diaphragm; and
- a pair of contacts in the circuit, one of the contacts being connected to the electrically activated diaphragm, and the contacts being closed when current flow through the electrically activated diaphragm is less than the predetermined level such that the presence of current flow through the electrically activated diaphragm greater than the predetermined level deforms the electrically activated diaphragm, causing the electrically activated diaphragm to move from the first position to the second position, breaking the circuit, de-energizing the current through the electrically activated diaphragm, and allowing the electrically activated diaphragm to return to the first position and remake the circuit.

17. The system of claim 16, wherein the electrically activated diaphragm is comprised of a piezoelectric material.

18. The system of claim 16, wherein the electrically activated diaphragm comprises a resilient diaphragm with a strip of piezoelectric material attached to one side.

19. The system of claim 16, wherein the electrically activated diaphragm is comprised of an electrostatic material.

20. The system of claim 16, wherein the electrically activated diaphragm comprises a resilient diaphragm with a strip of an electrostatic material attached to one side.

21. The system of claim 11, wherein the air-fueled device is a metal-air cell.

22. The system of clam 11, wherein the air-fueled device is a fuel cell.

* * * * *

UNITED STATES PATENT AND TRADEMARK OFFICE
CERTIFICATE OF CORRECTION

| | | |
|---|---|---|
| PATENT NO. | : 6,824,915 B1 | Page 1 of 1 |
| APPLICATION NO. | : 09/602187 | |
| DATED | : November 30, 2004 | |
| INVENTOR(S) | : Christopher S. Pedicini | |

It is certified that error appears in the above-identified patent and that said Letters Patent is hereby corrected as shown below:

On the cover page (page 2), under (56) References Cited Foreign Patent Documents, after JP 50-40772, replace "4/1975" with --2/1993--.

Signed and Sealed this

First Day of August, 2006

JON W. DUDAS
*Director of the United States Patent and Trademark Office*